(12) United States Patent
Goldfarb et al.

(10) Patent No.: US 8,635,940 B2
(45) Date of Patent: Jan. 28, 2014

(54) SOLENOID VALVE ASSEMBLY

(75) Inventors: Michael Goldfarb, Nashville, TN (US); Xiangrong Shen, Tuscaloosa, AL (US)

(73) Assignee: Vanderbilt University, Nashville, TN (US)

( * ) Notice: Subject to any disclaimer, the term of this patent is extended or adjusted under 35 U.S.C. 154(b) by 775 days.

(21) Appl. No.: 12/811,802

(22) PCT Filed: Jan. 7, 2008

(86) PCT No.: PCT/US2008/050382
§ 371 (c)(1),
(2), (4) Date: Sep. 29, 2010

(87) PCT Pub. No.: WO2009/088504
PCT Pub. Date: Jul. 16, 2009

(65) Prior Publication Data
US 2011/0005625 A1    Jan. 13, 2011

(51) Int. Cl.
*F15B 13/043*    (2006.01)

(52) U.S. Cl.
USPC .................................. 91/464; 91/466; 91/470

(58) Field of Classification Search
USPC ........... 91/466, 437, 436, 464, 462, 467, 470; 137/625.67, 625.25, 625.65, 625.23, 137/625.24; 60/384–386
See application file for complete search history.

(56) References Cited

U.S. PATENT DOCUMENTS

| | | | | |
|---|---|---|---|---|
| 2,166,940 A | * | 7/1939 | Conradson | 60/329 |
| 2,637,341 A | * | 5/1953 | Borst | 137/625.64 |
| 3,473,324 A | * | 10/1969 | Mercier Jean | 60/386 |
| 3,736,958 A | | 6/1973 | Rostad | 137/625.6 |
| 3,916,952 A | | 11/1975 | Pauliukonis | 137/625.64 |
| 5,108,070 A | * | 4/1992 | Tominaga | 251/65 |
| 5,163,353 A | | 11/1992 | Horstmann et al. | 91/426 |
| 6,000,431 A | * | 12/1999 | Langkamp | 137/625.23 |
| 6,755,214 B2 | | 6/2004 | Bento | 137/625.64 |

FOREIGN PATENT DOCUMENTS

| | | |
|---|---|---|
| DE | 42 27 563 | 2/1994 |
| JP | 46-14178 | 4/1971 |
| JP | 48-28829 | 9/1973 |
| JP | 57-98384 | 6/1982 |
| JP | 58 088276 | 5/1983 |
| JP | 63-45273 | 3/1988 |
| JP | 02-85671 | 7/1990 |
| JP | 2001-235044 | 8/2001 |
| JP | 2002-156053 | 5/2002 |
| JP | 2004-162920 | 6/2004 |

OTHER PUBLICATIONS

Al-Dakkan et al., "A multi-objective sliding mode approach for the energy for the energy saving control of pneumatic servo systems," *ASME International Mechanical Engineering Congress and Exposition*, 2003.

(Continued)

*Primary Examiner* — Edward Look
*Assistant Examiner* — Logan Kraft
(74) *Attorney, Agent, or Firm* — Parker Highlander PLLC

(57) ABSTRACT

A solenoid valve including a spool received within a housing. The spool is configured to move to multiple positions within the housing. The housing includes supply ports, exhaust ports, and outlet ports. When the spool is in a specific location, two outlet ports are in fluid communication with each other.

23 Claims, 22 Drawing Sheets

(56) References Cited

OTHER PUBLICATIONS

Al-Dakkan et al., "Energy saving control for pneumatic servo systems," *ASME/IEEE International Conference on Advanced Intelligent Mechatronics*, 1:284-289, 2003.

Arinaga et al., "Approach for energy-saving of pneumatic systems," in *Proceedings of the First FPNI-PhD Symposium*, pp. 49-56, 2000.

Bachmann and Surgenor, "On design and performance of a closed circuit pneumatic positioning system," *The Fifth Scandinavian International Conference on Fluid Power*, 1:309-322, 1997.

Brun et al., "Limited energy consumption in positioning control of an electropneumatic actuator," *Bath Workshop on Power Transmission and Motion Control*, pp. 199-211, 1999.

Kawakami et al., "Application of energy-saving to pneumatic driving systems," in *Proceedings of the Fourth JHPS International Symposium*, pp. 201-206, 1999.

PCT International Preliminary Report on Patentability issued in International Application No. PCT/US2008/050382, issued Jul. 13, 2010.

PCT International Search Report and Written Opinion issued in International Application No. PCT/US2008/050382, mailed Oct. 21, 2008.

Pu et al., "A new strategy for closed-loop control of servo-pneumatic systems with improvied energy efficiency and system response," *The Fifth Scandinavian International Conference on Fluid Power*, pp. 339-352, 1997.

Quaglia and Gastaldi, "Model and dynamic of energy saving pneumatic actuator," *The Fourth Scandinavian International Conference on Fluid Power*, 1:481-492, 1995.

Quaglia and Gastaldi, "The design of pneumatic actuator with low energy consumption," *The Fourth Triennial International Symposium on Fluid Control, Fluid Measurement, and Visualization*, pp. 1061-1066, 1994.

Sanville, "Two-level compressed air systems for energy saving," *The Seventh International Fluid Control Symposium*, pp. 375-383, 1986.

Shen and Goldfarb, "Energy saving in pneumatic servo control utilizing interchamber cross-flow," *Journal of Dynamic Systems, Measurement, and Control*, 129:303-310, 2007.

Wang et al., "Energy efficient optimal control of pneumatic actuator systems," *System Science*, 26(3):109-123, 2000.

Official Action; issued in corresponding Japanese Application No. 2010-541447, dated Sep. 19, 2012.

Decision to Grant a Patent, issued in corresponding Japanese Application No. 2010-541447, dated May 13, 2013.

* cited by examiner

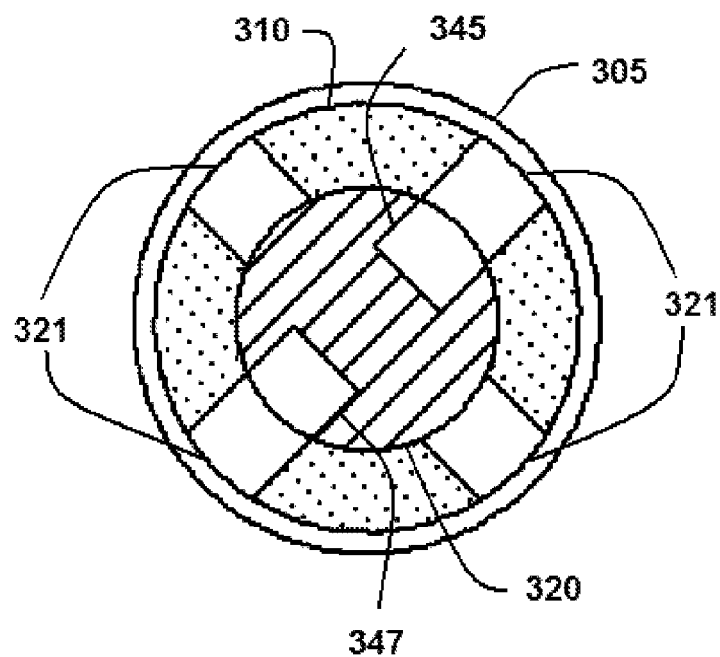
FIG. 9-A
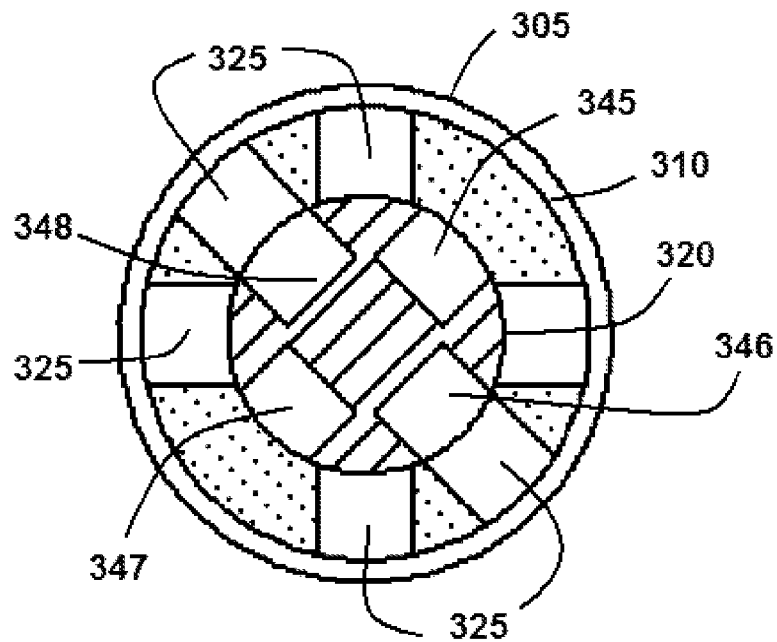
FIG. 9-B

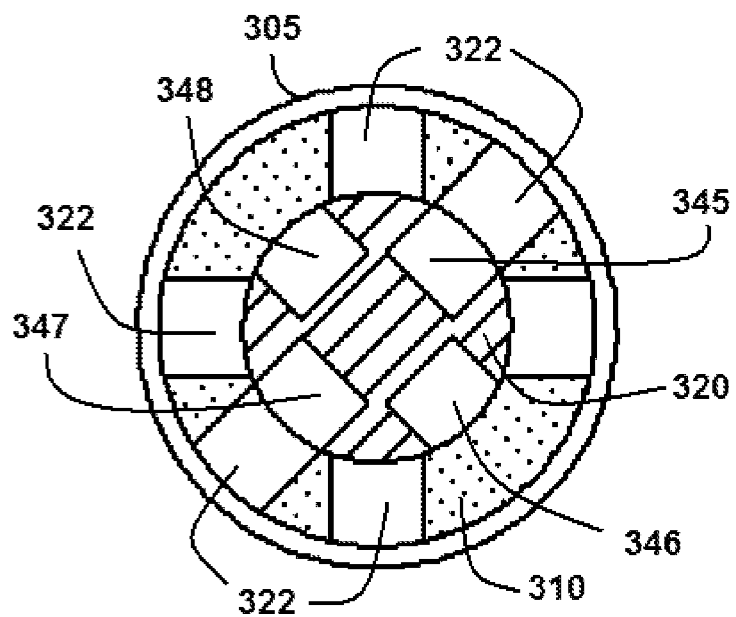
FIG. 9-C
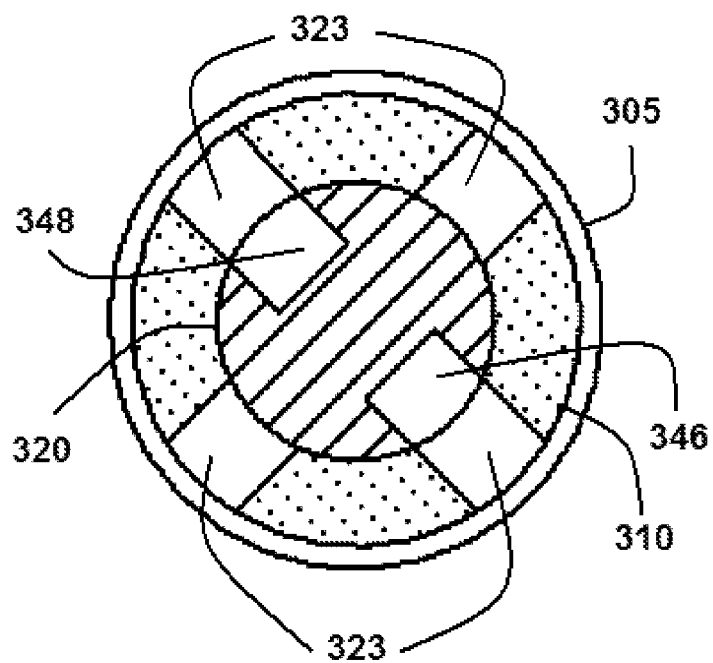
FIG. 9-D

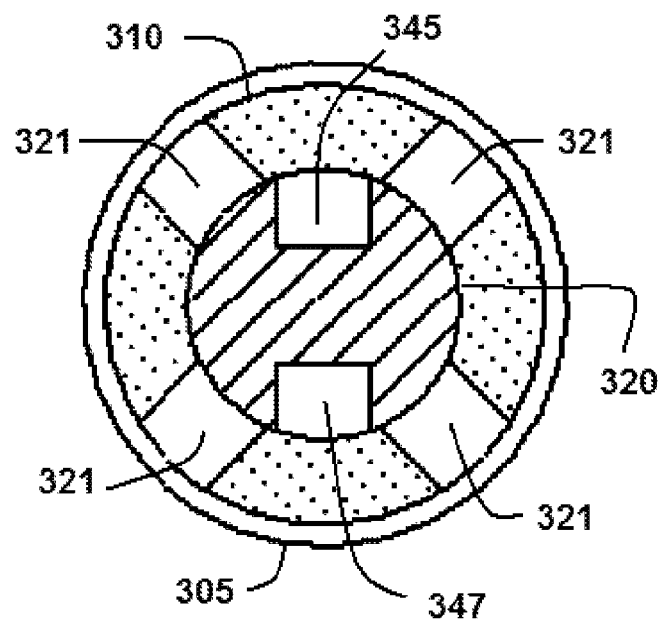
FIG. 11-A
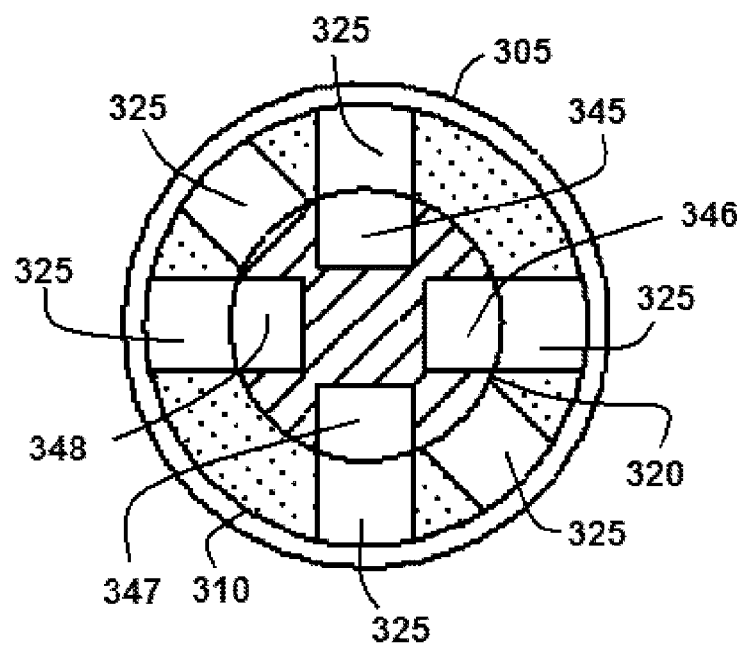
FIG. 11-B

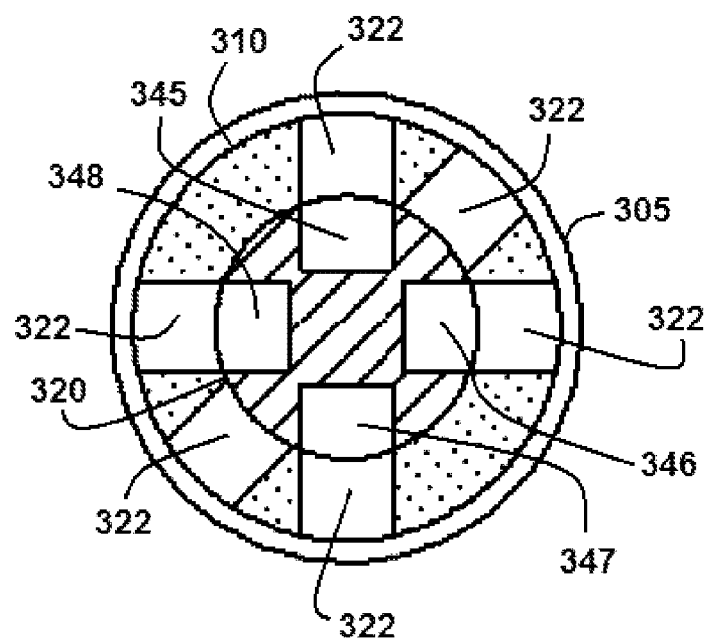
FIG. 11-C
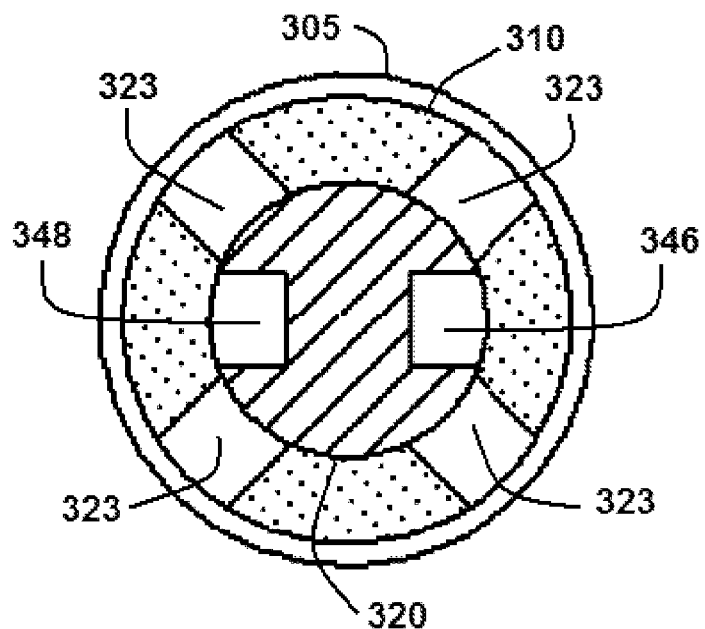
FIG. 11-D

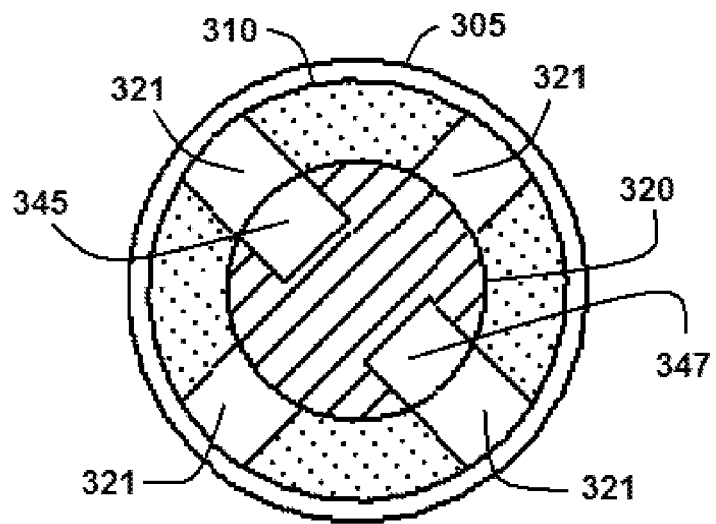
FIG. 13-A
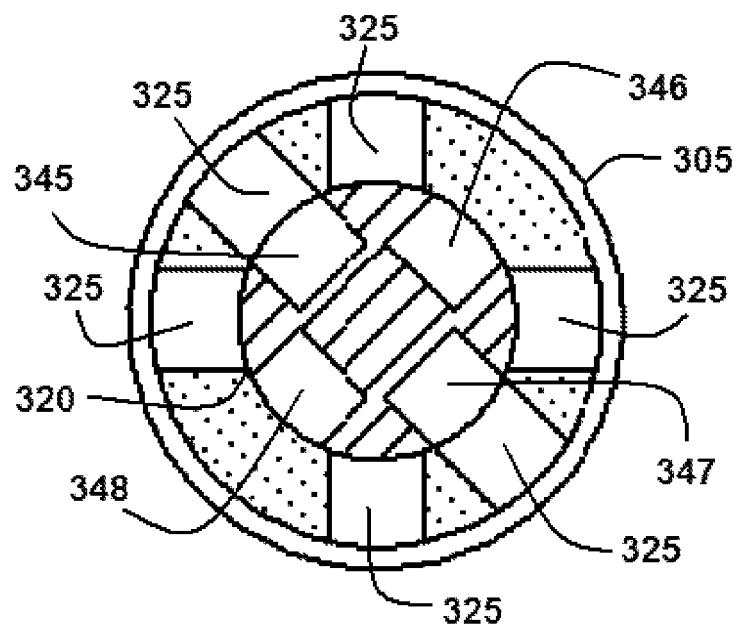
FIG. 13-B

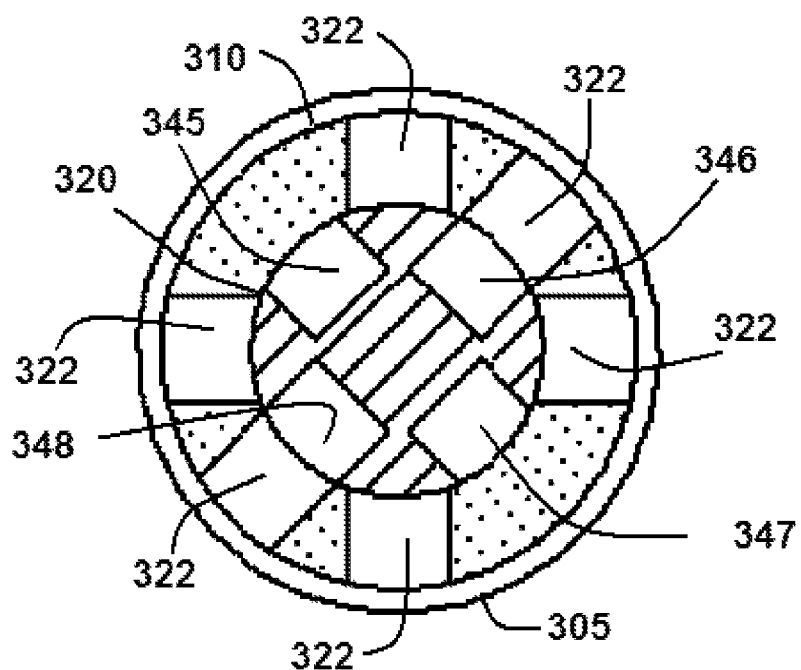
FIG. 13-C
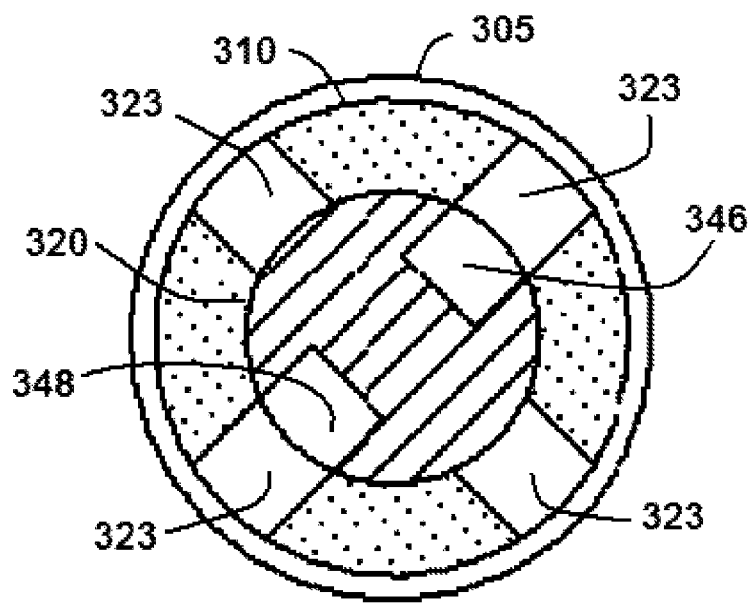
FIG. 13-D ic # SOLENOID VALVE ASSEMBLY

STATEMENT REGARDING FEDERALLY SPONSORED RESEARCH OR DEVELOPMENT

The government may own rights in this invention pursuant to grant numbers N660001-06-8005 JHUAPL from the Department of Defense.

This application is a national phase application under 35 U.S.C. §371 of International Application No. PCT/US2008/050382, filed Jan. 7, 2008. The entire contents of the above-referenced disclosure is specifically incorporated herein by reference without disclaimer.

FIELD OF THE INVENTION

The present disclosure relates generally to solenoid valve assemblies used to control the position of a fluid power actuator. The present disclosure relates more specifically to solenoid valve assemblies that recycle fluid from one portion of the actuator assembly to another portion of the actuator assembly.

BACKGROUND INFORMATION

Typical solenoid valve systems utilize a binary-type fluid power positioning system in which the solenoid valve is directed to one of two or three positions. In many existing two-position valves, the solenoid is coupled to an actuator assembly with a double-acting piston. When the solenoid valve is in the first position, air (or other fluid) is directed to one side of the piston, while air on the second (opposite) side of the piston is vented to atmosphere. When the solenoid valve is in the second position, air is directed to the second side of the piston, and air on the first side of the piston is vented to atmosphere. In such examples, essentially the entire volume of air on one side of the piston is vented to atmosphere with each piston stroke. Such designs therefore require comparatively high volumes of air to actuate the piston.

Typical three-position solenoid valve systems operate in a fashion similar to the two-position systems described above. However, in certain examples the solenoid valve can be placed in a third position that effectively shuts off air to the actuator. As in the case of the two-position valve described above, essentially the entire volume of air on one side of the piston is vented to atmosphere with each piston stroke.

It is therefore desirable to provide a solenoid valve and actuator system that captures a portion of the air that is typically vented to atmosphere during movement of the actuator. The air that is captured can be directed to the opposing side of the actuator, thereby reducing the volume of air required to redirect the actuator. It is also desirable to provide such a solenoid valve that can be retrofitted to replace existing solenoid valve systems without extensive modifications.

SUMMARY

Exemplary embodiments of the present disclosure comprise a solenoid valve system configured to recycle fluid from one side of an actuator to another side of the actuator when the solenoid valve switches positions. Certain embodiments comprise a system with a housing having: a first end; a second end; a plurality of ports comprising supply ports, exhaust ports, and outlet ports; and a spool received within the housing, where the spool is configured to move within the housing from a first position to a second position and to a third position. In certain embodiments, the second position is between the first position and the third position and a first outlet port is in fluid communication with a second outlet port when the spool is in the second position. In certain embodiments, the first outlet port is adjacent the second outlet port and/or the spool is configured to slide laterally within the housing. In other embodiments, the spool is configured to rotate within the housing. In certain embodiments, the system comprises an actuator, wherein the actuator comprises a first side and a second side, and the first outlet port is in communication with the first side of the actuator, and the second outlet port is in communication with the second side of the actuator.

Certain embodiments comprise a first biasing member configured to exert a first force upon the actuator and a second biasing member configured to exert a second force upon the actuator. In certain embodiments, when the spool is in the first position, a supply port is in fluid communication with the first outlet port, and an exhaust port is in fluid communication with the second outlet port. In certain embodiments, when the spool is in the third position, a supply port is in fluid communication with the second outlet port, and an exhaust port is in fluid communication with the first outlet port.

In certain embodiments, the spool is proximal to the first end of the housing when the spool is in the first position and the spool is proximal to the second end of the housing when the spool is in the third position. In certain embodiments, the plurality of ports extend through the housing, and the spool comprises a plurality of recesses configured to align with the plurality of ports. In certain embodiments, the recesses extend circumferentially around the spool, while in other embodiments the recesses extend longitudinally along the spool.

In certain exemplary embodiments, the spool is configured to slide laterally within the housing to allow a first set of ports to be in fluid communication with each other when the spool is in the first position, a second set of ports to be in fluid communication with each other when the spool is in the second position, and a third set of ports to be in fluid communication with each other when the spool is in the third position.

In certain exemplary embodiments, the spool is configured to rotate within the housing to allow a first set of ports to be in fluid communication with each other when the spool is in the first position, a second set of ports to be in fluid communication with each other when the spool is in the second position, and a third set of ports to be in fluid communication with each other when the spool is in the third position.

Other exemplary embodiments comprise a system comprising an actuator assembly and a solenoid valve assembly. In certain embodiments, the actuator assembly comprises: a casing comprising a volume of fluid; an actuator disposed within the casing, wherein the actuator separates the volume of fluid into a first volume and a second volume; and a solenoid valve assembly in fluid communication with the actuator assembly. In certain embodiments, the solenoid valve assembly can be placed in a first position, a second position, or a third position, and the first volume is not in fluid communication with the second volume when the solenoid valve assembly is in the first position or the third position, and the first volume is in fluid communication with the second volume when the solenoid valve assembly is in the second position.

Certain embodiments also comprise a fluid supply system wherein the fluid supply system is in fluid communication with the first volume when the solenoid valve assembly is in the first position, and the fluid supply system is in fluid communication with the second volume when the solenoid valve assembly is in the third position. In certain embodiments, the solenoid valve assembly comprises a spool configured to slide laterally within the housing, while in other embodiments, the solenoid valve assembly comprises a spool configured to rotate within the housing.

Certain embodiments comprise a system comprising an actuator assembly and a solenoid valve, where the actuator assembly comprises an actuator having a first volume of fluid on a first side of the actuator and a second volume of fluid on a second side of the actuator, and the solenoid valve has a sleeve comprising a plurality of ports. In certain embodiments, the solenoid valve is in fluid communication with the actuator assembly, a first port is in fluid communication with the actuator, a second port is in fluid communication with the actuator, and the first port is adjacent to the second port. Certain embodiments also comprise a fluid supply, a third port in fluid communication with the fluid supply, and a fourth port configured to vent to the environment. In certain embodiments, the actuator comprises a piston, a first spring configured to engage a first side of the piston, and a second spring configured to engage a second side of the piston.

In certain embodiments, the solenoid valve comprises a slide member disposed within the sleeve, the slide member is configured to slide from a first position proximal to a first end of the sleeve to a second position proximal to a second end of the sleeve, and the first port and the second port are in fluid communication with each other when the slide valve is in a third position between the first position and the second position.

Certain embodiments comprise a housing having: an outer surface; an inner surface forming an internal bore; a first end; a second end; a supply port; an exhaust port; a first outlet port; and a second outlet port, wherein the supply port, the exhaust port, the first outlet port and the second outlet port each extend from the outer surface of the housing to the inner surface of the housing. Certain embodiments also comprise a sliding member received within the internal bore, wherein the sliding member comprises a plurality of sealing members configured to prevent fluid communication between a pair of adjacent ports; and a plurality of recesses configured to allow fluid communication between a pair of adjacent ports, wherein a first recess allows communication between the first outlet port and the second outlet port when the sliding member is positioned at an intermediate position between the first end and the second end.

BRIEF DESCRIPTION OF THE DRAWINGS

FIG. 9-A illustrates a first section view of the embodiment of FIG. 8.

FIG. 9-B illustrates a second section view of the embodiment of FIG. 8.

FIG. 9-C illustrates a third section view of the embodiment of FIG. 8.

FIG. 9-D illustrates a fourth section view of the embodiment of FIG. 8.

FIG. 11-A illustrates a first section view of the embodiment of FIG. 10.

FIG. 11-B illustrates a second section view of the embodiment of FIG. 10.

FIG. 11-C illustrates a third section view of the embodiment of FIG. 10.

FIG. 11-D illustrates a fourth section view of the embodiment of FIG. 10.

FIG. 13-A illustrates a first section view of the embodiment of FIG. 12.

FIG. 13-B illustrates a second section view of the embodiment of FIG. 12.

FIG. 13-C illustrates a third section view of the embodiment of FIG. 12.

FIG. 13-D illustrates a fourth section view of the embodiment of FIG. 12.

DETAILED DESCRIPTION OF EXEMPLARY EMBODIMENTS

Figure 1:
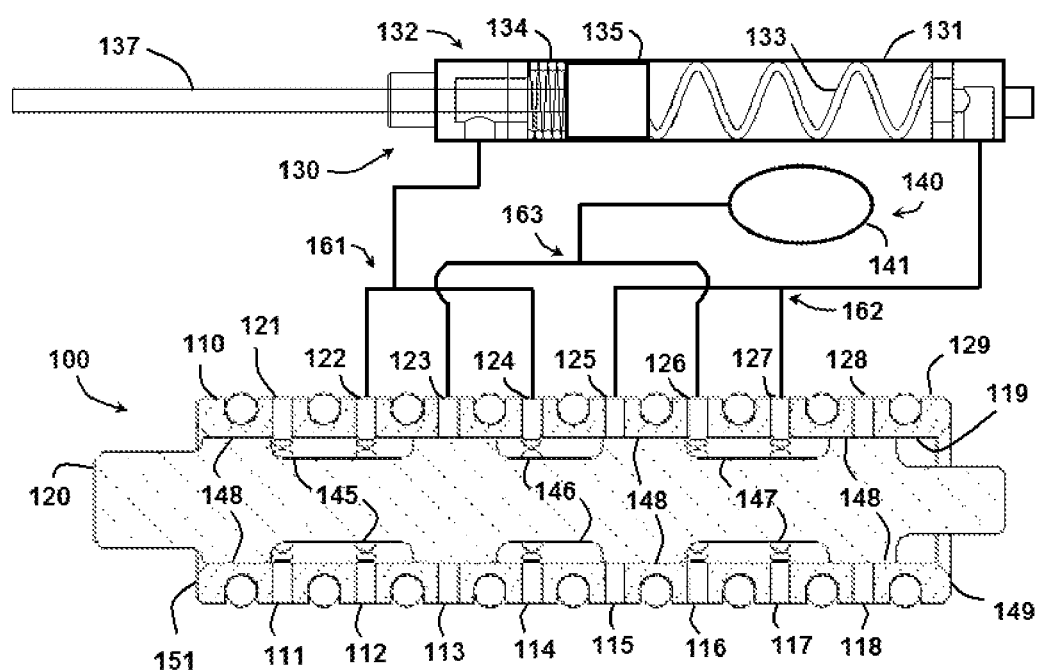
FIG. 1 illustrates a section view of an exemplary embodiment of a solenoid valve and actuator assembly in a first position.
Figure 2:
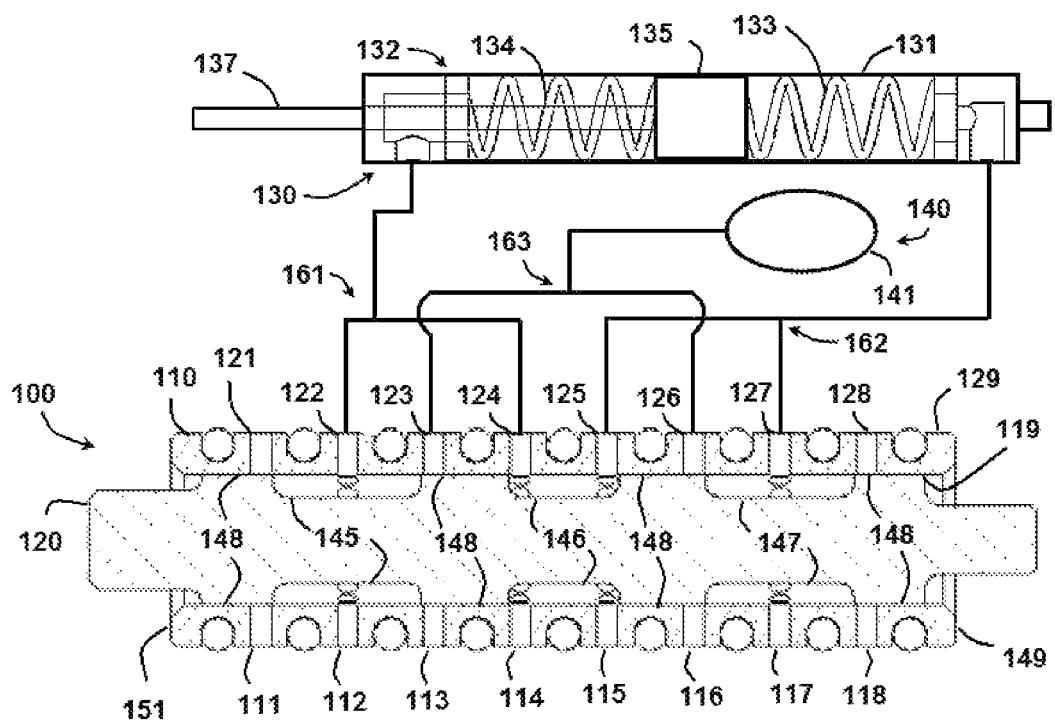
FIG. 2 illustrates a section view of the embodiment of FIG. 1 in a second position.
Figure 3:
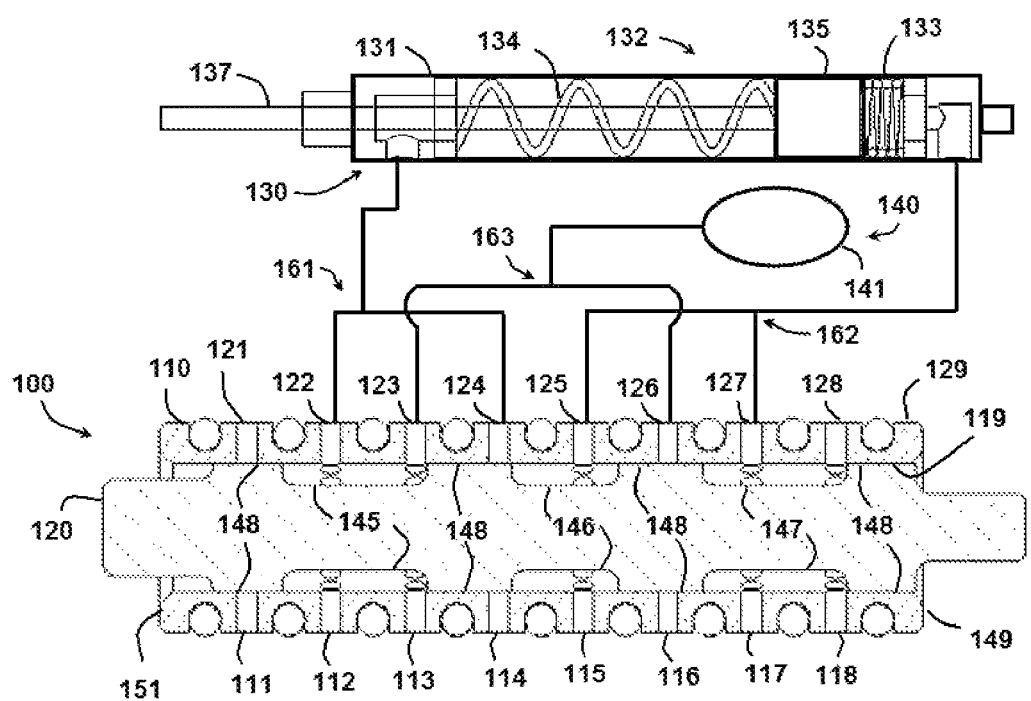
FIG. 3 illustrates a section view of the embodiment of FIG. 1 in a third position.

Referring now to FIGS. 1-3, an exemplary embodiment of this disclosure comprises a solenoid valve 100 comprising a sleeve or housing 110 and a sliding member or spool 120. In this embodiment, valve 100 is coupled to an actuator assembly 130 and a fluid supply system 140. In the embodiment shown, actuator assembly 130 comprises a casing 131, an actuator 132 (having a rod 137 and a piston 135), a first biasing member 133 and a second biasing member 134. In certain embodiments, first and second biasing members 133 and 134 may be compression springs. In the embodiment shown, piston 135 of actuator 132 divides a volume of fluid contained within casing 131 into two separate volumes (one on each side of piston 135). While a linear actuator is shown, other embodiments may comprise different configurations, such as a rotary actuator (not shown). Rotary actuator embodiments may comprise an actuator that separates the fluid contained within the casing into two volumes, with a first side of the actuator in fluid communication with a first volume, and a second side of the actuator in fluid communication with a second volume. However, in rotary actuator embodiments, the actuator is configured to rotate within the casing rather than slide linearly, and the biasing members may be torsion springs rather than compression springs.

In this exemplary embodiment, fluid supply system 140 comprises a reservoir 141. In other embodiments, fluid supply system may comprise a compressor or pump (not shown) configured to compress a fluid and supply it to reservoir 140. In certain exemplary embodiments, fluid supply system 140 may contain air, while in other embodiments, fluid supply system may comprise other fluids, including liquids (for example, hydraulic fluid).

In the exemplary embodiment shown, housing 110 comprises a left end 151, a right end 149, an external wall 129, an internal bore 119 and a series of ports 111-118 and 121-128 extending through external wall 120 to internal bore 119. Note that the pair of ports occupying the opposing positions (111 and 121, 112 and 122, . . . 118 and 128) are connected via an external flow path (not shown here) and thus can be taken as the same port. In this embodiment, exhaust ports 111/121 and 118/128 exhaust to atmosphere, while supply ports 113/123 and 116/126 are coupled to fluid supply system 140 via coupling system 163. In this exemplary embodiment, outlet ports 112/122, 114/124, 115/125, and 117/127 are in fluid communication with actuator assembly 130. In other exemplary embodiments, outlet ports 112/122, 114/124, 115/125, and 117/127 may be in fluid communication with an actuator assembly with a different configuration than that shown in the embodiment of FIGS. 1-3. Non-limiting, exemplary embodiments of other such configurations are illustrated in additional figures in this disclosure. As used herein, the term "outlet port" is generally understood to include any port which can be coupled to an actuator to provide fluid communication between the outlet port and the actuator.

For purposes of clarity in illustration, in FIG. 1 only ports 121-128 are shown coupled to external components. As shown in FIG. 1, outlet ports 122 and 124 are coupled to casing 131 on the left side of piston 135 via coupling system 161. Also shown in FIG. 1, outlet ports 125 and 127 are coupled to casing 131 on the right side of piston 135 via coupling system 162. In exemplary embodiments, coupling systems 161, 162 and 163 may comprise a system of tubing, piping, or any other well-known system used to provide fluid communication between components.

As shown in FIG. 1, spool 120 comprises an external surface 148 comprising a series of reliefs or recesses 145-147. Depending upon the position of spool 120 within internal bore 119, external surface 148 or recesses 145-147 will align with one or more ports 111-118 and 121-128. As shown in FIG. 1, spool 120 is disposed towards left end 151 of housing 110. In this position, recess 145 aligns with ports 111/121 and 112/122 so that they are in fluid communication. In the exemplary embodiment shown in FIG. 1, recess 146 aligns with port 114/124. Also shown in FIG. 1, recess 147 aligns with ports 116/126 and 117/127 so that they are in fluid communication. In addition, external surface 148 aligns with ports 113/123, 115/125, and 118/128 so that each of these ports is isolated from the other ports. In the exemplary embodiments shown, external surface 148 is a close tolerance fit within internal bore 119 so that fluid is restricted from flowing from ports 113/123, 115/125, and 118/128 to other ports. As a result, ports 113/123, 115/125, and 118/128 are not in fluid communication with other ports.

As previously mentioned, exhaust ports 111/121 and 118/128 exhaust or vent to atmosphere and outlet ports 112/122 and 114/124 are coupled to casing 131 on the left side of piston 135 (i.e. the left side of casing 131). When spool 120 is in the position shown in FIG. 1, the portion of casing 131 on the left side of piston 135 is vented to atmosphere. Therefore, the fluid pressure in the left portion of casing 131 will essentially be atmospheric pressure. As previously mentioned, supply port 116/126 are coupled to fluid supply system 140, and outlet port 117/127 are coupled to the portion of casing 131 to the right of piston 135 (i.e. the right side of casing 131). In the position shown in FIG. 1, supply port 116/126 is in fluid communication with outlet port 117/127; therefore, the right side of casing 131 will be essentially at or near the pressure in fluid supply system 140.

In the embodiment shown in FIG. 1, the pressure in fluid supply system 140 is greater than atmospheric pressure. Therefore, the pressure in the right side of casing 131 is greater than the pressure in the left side of casing 131. As a result of the differential pressure across piston 135, it will be moved to the left within casing 131. In the embodiment shown, biasing members 133 and 134 also exert forces on piston 135. The differential fluid pressure across piston 135 compresses biasing member 134 (which exerts a force on piston 135 biasing piston 135 to the right). In the position shown in FIG. 1, biasing member 133 may a force to either the right or left on piston 135.

Referring now to FIG. 2, solenoid valve 100 is shown with spool 120 located in an intermediate position between left end 151 and right end 149. In this position, recess 145 is aligned with outlet port 112/122, but outlet port 112/122 is isolated from other ports. In addition, recess 147 has aligned with outlet port 117/127, but outlet port 117/127 is also isolated from other ports. As shown in the position of FIG. 2, recess 146 has aligned with outlet ports 114/124 and 115/125 so that these ports are in fluid communication with each other. As previously mentioned, outlet port 114/124 is in fluid communication with the left side of casing 131, and outlet port 115/125 is in fluid communication with the right side of casing 131. In the position shown in FIG. 2, the left side of casing 131 is in fluid communication with the right side of casing 131. Also shown in FIG. 2, external surface 148 has blocked off exhaust ports 111/121 and 118/128 which vent to atmosphere. The right side of casing 131 and the left side of casing 131 are therefore not vented to atmosphere.

Assuming that spool 120 moves from the position shown in FIG. 1 to the position shown in FIG. 2, fluid will flow from the right side of casing 131 to the left side of casing 131. As mentioned in the discussion of the embodiment shown in FIG. 1, the left side of casing 131 is at essentially atmospheric pressure and the right side of casing 131 is essentially at the pressure of fluid supply system 140, which is greater than atmospheric pressure. As spool 120 moves to the position shown in FIG. 2, the left side of casing 131 is no longer vented to atmosphere and the right side of casing 131 is no longer in fluid communication with fluid supply system 140. After spool 120 moves to the position shown in FIG. 2, the left side of casing 131 is in fluid communication with the right side of casing 131. Because the right side of casing 131 was initially at a greater pressure than the left side of casing 131, fluid will flow from the right side to the left side of casing 131. More specifically, fluid will flow from the right side of casing 131, through coupling system 162, outlet port 115/125, recess 146, outlet port 114/124, coupling system 161 and to the left side of casing 131. In this manner, fluid from the right side of casing 131 is redirected or recycled to the left side of casing 131. This causes the fluid pressure on the right side of piston 131 to decrease and the fluid pressure on the left side of piston 131 to increase. As the pressure on each side of piston 135 approaches equilibrium, biasing member 134 will exert a force on piston 131 and move it to the right as shown in FIG. 2. In the configuration shown in FIG. 2, biasing member 133 is exerting a force on piston 131 towards the left. However, in certain exemplary embodiments, biasing member 134 can exert a counteracting force great enough to overcome the force of biasing member 133. For example, if biasing members 133 and 134 are equivalent compression springs, then biasing member 134 will exert a greater force than biasing member 133 so long as biasing member 134 is compressed a greater amount than biasing member 133 to compensate for the differential force applied to the piston (because the area on the left side of the piston is smaller than the right side by the area of the piston rod, while the pressure is the same), so that the piston is in an equilibrium status.

Referring now to FIG. 3, spool 120 of solenoid valve 100 is shown in a position proximal to right end 149 of housing 110. In this position, recess 146 is aligned with port 115/125, but port 115/125 is isolated from other ports. In addition, recess 147 has aligned with ports 117/127, and 118/128 so that port 117/127 (which is coupled to the right side of casing 131) is vented to atmosphere. In the position shown in FIG. 3, recess 145 has aligned with ports 112/122 and 113/123 so that port 112/122 (which is coupled to the left side of casing 131) is in fluid communication with fluid supply system 140. In this position, the left side of casing 131 is at a higher pressure than the right of casing 131 and piston 135 is moved to the right side of casing 131.

Spool 120 can then be moved from the position shown in FIG. 3 to the position shown in FIG. 2 and the cycle can be repeated. In this manner, piston 135 can be moved within casing 131 based on the position of spool 120 within housing 110. Spool 120 can be moved within housing 110 via an electromagnetic coil (not shown) or by other mechanisms known in the art for positioning solenoid valves. While housing 110 and spool 120 are shown with a cylindrical configuration in the embodiment shown in FIGS. 1-3, other embodiments may have different configurations with cross-sections that are not circular. For example, housing 110 and spool 120 may have a cross-section that is shaped like a square or other polygon.

Figure 4:
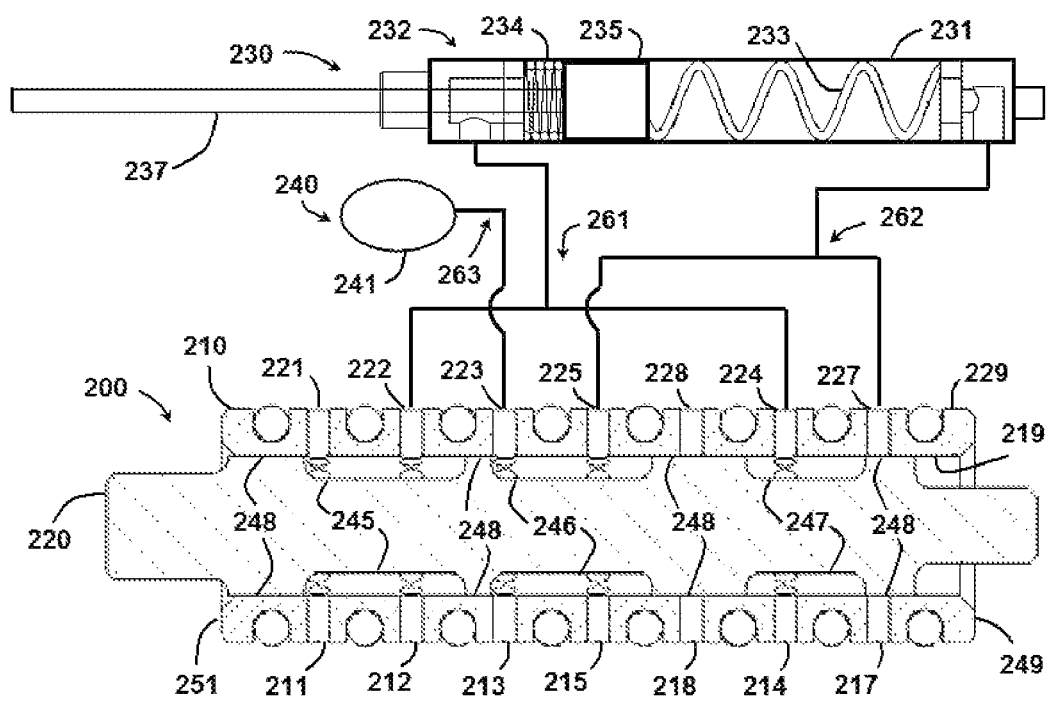
FIG. 4 illustrates a section view of an exemplary embodiment of a solenoid valve and actuator assembly in a first position.
Figure 5:
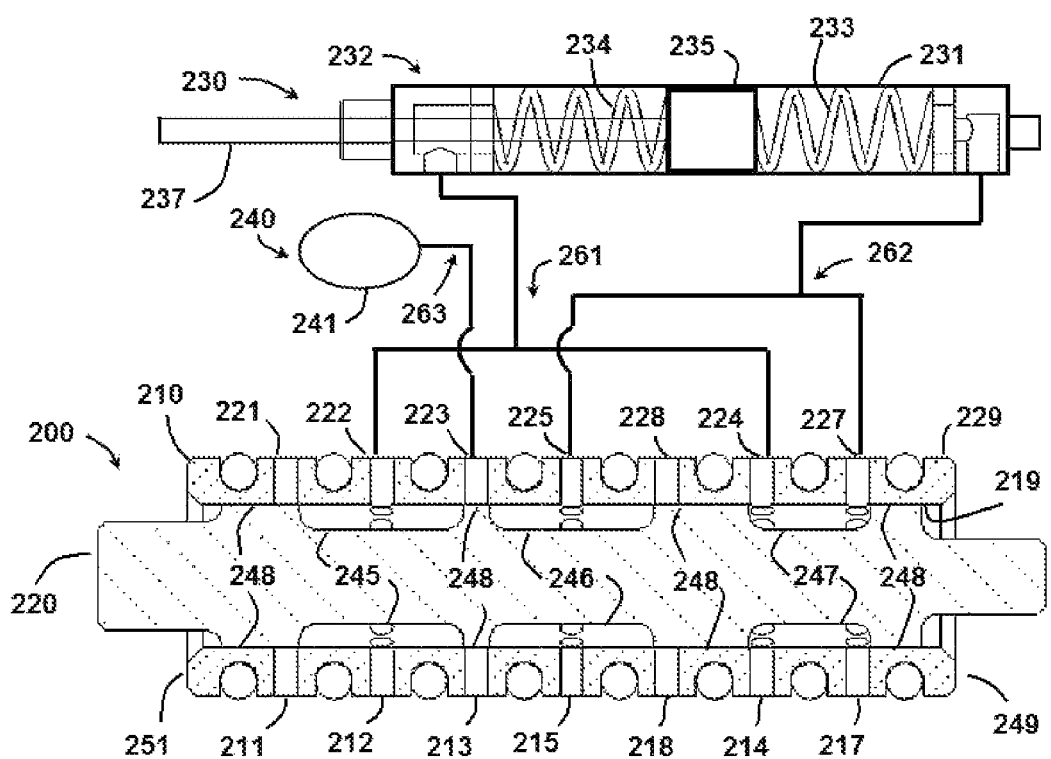
FIG. 5 illustrates a section view of the embodiment of FIG. 4 in a second position.
Figure 6:
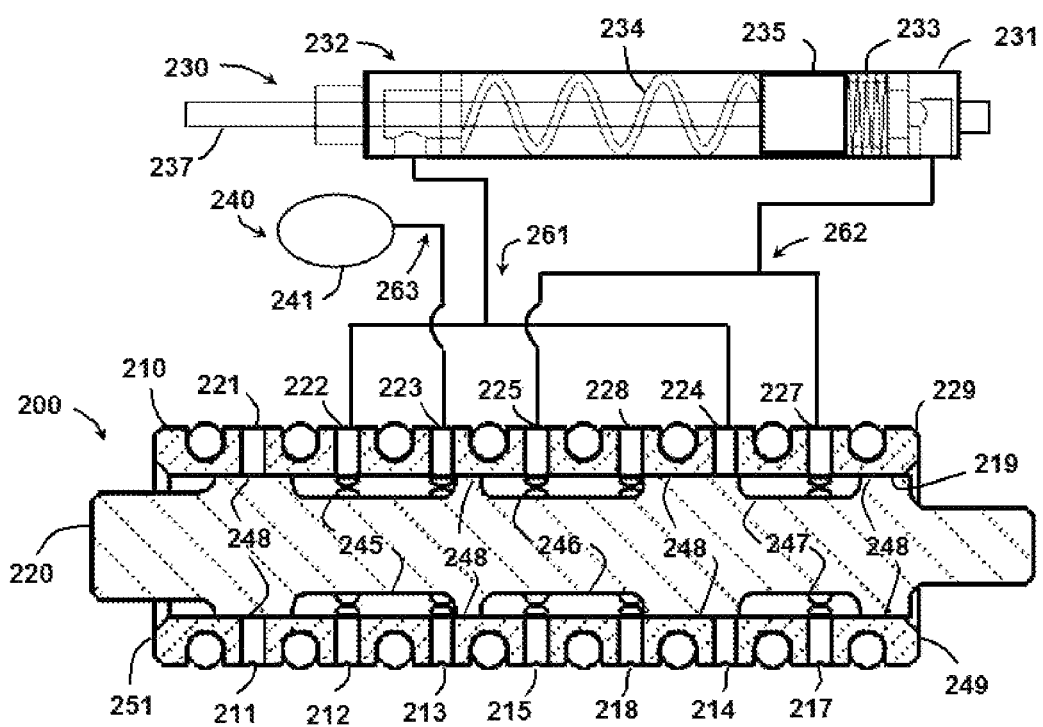
FIG. 6 illustrates a section view of the embodiment of FIG. 4 in a third position.
Figure 7:
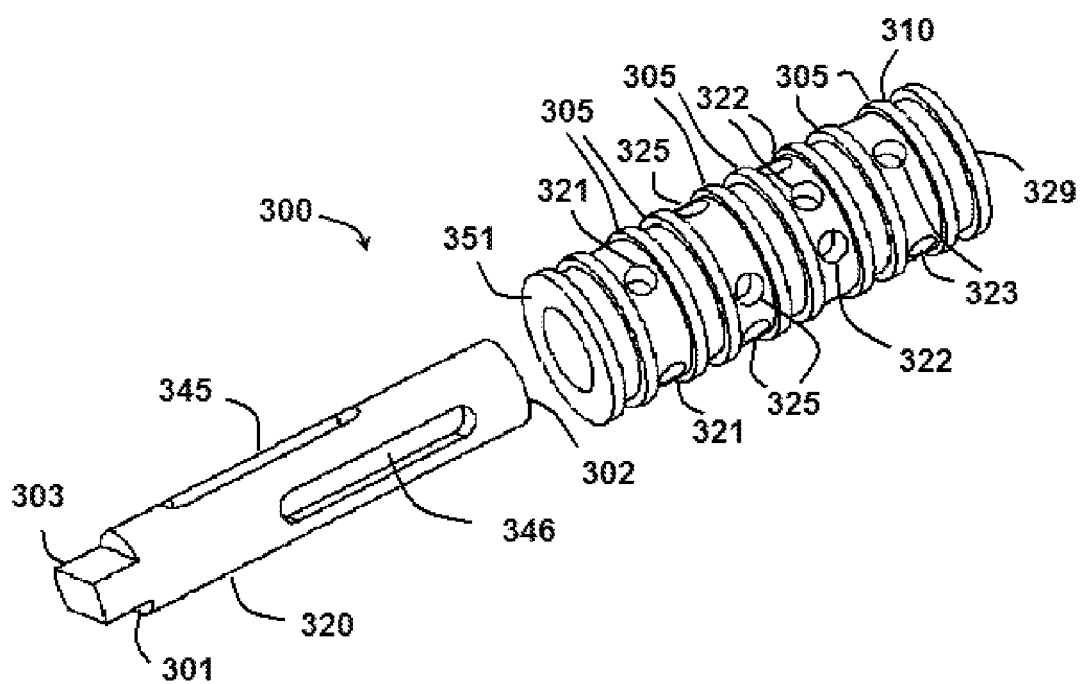
FIG. 7 illustrates an exploded view of an exemplary embodiment of a solenoid valve assembly.

Referring now to FIGS. 4-6, an alternative embodiment of a solenoid valve system 200 comprises a housing 210, a spool 220, an actuator assembly 230 (having a rod 237 and a piston 235), and a fluid supply system 240. Solenoid valve system 200 is generally equivalent to solenoid valve system 100; however, solenoid valve system 200 comprises a different number and configuration of ports than solenoid valve system 100 and the recesses formed in spool 200 are a different configuration than those of spool 100. Specifically, the exemplary embodiment shown in FIG. 4 comprises seven ports instead of eight ports. Solenoid valve system 200 comprises a single supply port 213/223 coupled to fluid supply system 240 rather than two supply ports as shown in the embodiment of FIGS. 1-3. Other aspects of solenoid valve system 200 are generally equivalent to those of solenoid valve system 100. Therefore, like features and elements in solenoid valve system 200 are identified with similar reference numbers to those used in FIGS. 1-3 (with the exception that reference numbers for FIGS. 4-6 begin with "2" instead of "1").

As shown in FIG. 4, spool 220 is proximal to left end 251 of housing 210. In this position, recess 245 is aligned with exhaust port 211/221 and port 212/222 which is in fluid communication with the left side of casing 231. Therefore, the left side of casing 231 is generally at atmospheric pressure. Also shown in FIG. 4, recess 246 is aligned with supply port 213/223 and port 215/225 which is in fluid communication with the right side of casing 231. Therefore, the right side of casing 231 is generally at the pressure of fluid supply system 240. Also shown in FIG. 4, recess 247 has isolated port 214/224 (which is in fluid communication with the left side of casing 231) from the other ports. In the configuration shown in FIG. 4, piston 235 is forced to the left side of casing 231.

Referring now to FIG. 5, spool has moved to a position more centrally located between left end 251 and right end 249. In this position, recess 245 has isolated port 212/222 and recess 246 has isolated port 215/225. In addition, recess 247 has aligned with port 214/224 (which is in fluid communication with the left side of casing 231) with port 217/227 (which is in fluid communication with the right side of casing 231). As a result, the left side of casing 231 is in fluid communication with the right side of casing 231 and the differential fluid pressure across piston 235 approaches equilibrium. As a result biasing member 234 biases piston 235 to the position shown in FIG. 5.

Referring now to FIG. 6, spool 220 is shown in a position proximal to right end 249 of housing 210. In this position, recess 245 is aligned with supply port 213/223 and left side port 212/222. Recess 246 is aligned with exhaust port 218/228 and right side port 215/225. Also shown in FIG. 6, recess 247 is aligned with, and isolates, right side port 217/227. In this position, the left side of casing 231 is in fluid communication with fluid supply system 240 and the right side of casing 231 is vented to atmosphere. Piston 235 will be moved towards the right end of casing 231.

Similar to the embodiment of FIGS. 1-3, the positions shown in FIGS. 4-6 can be cycled so that piston 235 is moved from a position near one end of casing 231 towards the other end and back.

Referring now to FIGS. 7-13, an exemplary embodiment of solenoid valve system 300 comprises a rotary configuration. Solenoid valve system 300 can be coupled to an actuator assembly (not shown) similar to actuator assembly 130 or 230 in the previously-described embodiments. Solenoid valve system 300 may also be coupled to a fluid supply system similar to fluid supply system 140 or 240 in the previously-described embodiments. The embodiment of FIGS. 7-13 comprises a housing 310 and a rotary member 320 (instead of a spool as shown in the previous embodiments). Rotary member 320 rotates within housing 310 to align reliefs or recesses 345-348 on the external surface of rotary member 320 with ports in housing 310.

Housing 310 comprises a first end 351 and a second end 329 with a series of ports distributed between them. In this specific embodiment, housing 310 comprises a series of supply ports 321 proximal to first end 351, and a series of exhaust ports 323 proximal to second end 329. Housing 310 further comprises a series of first actuator ports 325 proximal to supply ports 321 and a series of second actuator ports 322 between first actuator ports 325 and exhaust ports 323. Housing 310 further comprises a series of sealing members or ridges 305 between the various ports. Ridges 305 allow one set of ports to be isolated from an adjacent set of ports for purposes of preventing fluid communication between the various ports and external systems (such as actuator systems and fluid supply systems). For purposes of clarity, not all ridges 305 are labeled in FIGS. 7 and 8.

In the embodiment shown, rotary member 320 comprises a first end 301 and a second end 302. First end 301 comprises an engagement member 303 that allows a solenoid actuator (not shown) to rotate rotary member 320. In this embodiment, rotary member 320 comprises a series of recesses 345-348 along its outer surface. Recesses 345 and 347 are approximately 180 degrees apart, and are aligned longitudinally (i.e., the recesses are generally the same length and the same distance from first end 301 and second end 302). Similarly, recesses 346 and 348 are also approximately 180 degrees apart and aligned longitudinally.

Figure 8:
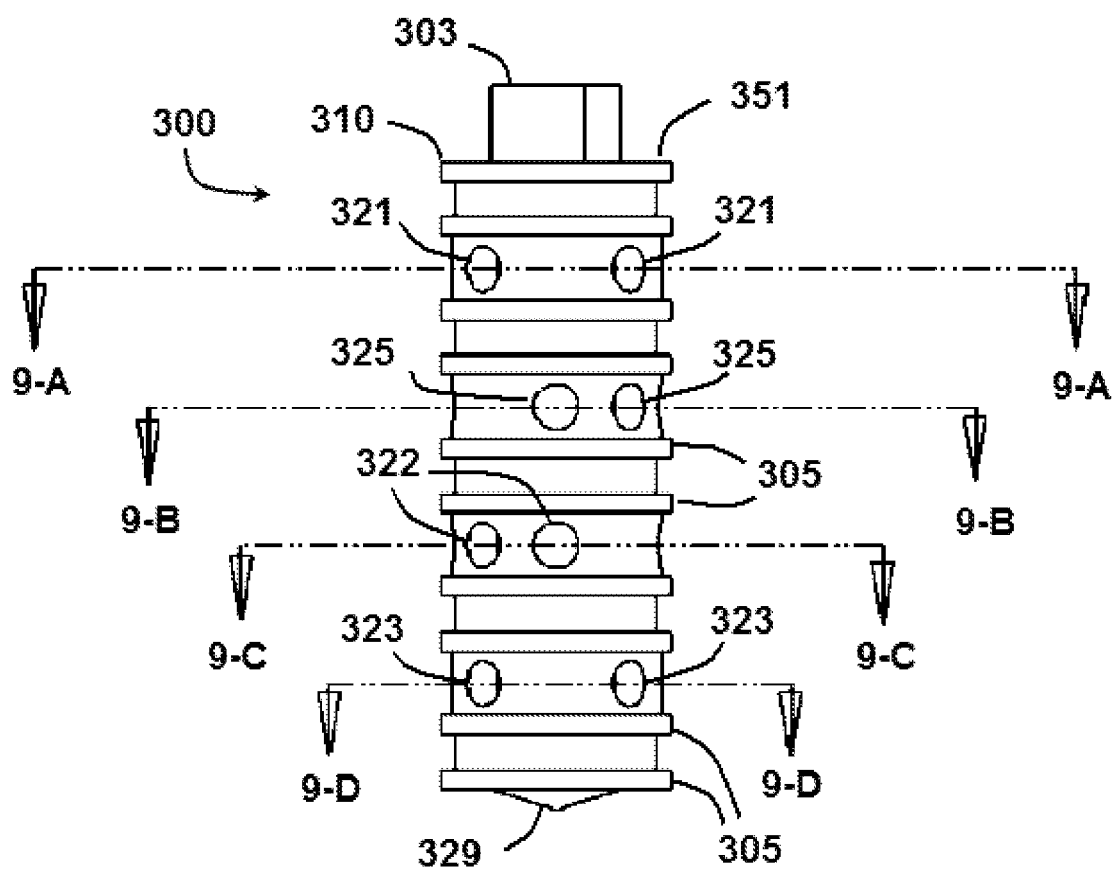
FIG. 8 illustrates an assembly view of the embodiment of FIG. 7 in a first position.

Referring now to FIG. 8, an assembly view of housing 310 and rotary member 320 is shown with rotary member 320 positioned in a specific position within housing 310. Specifically, rotary member 320 is positioned so that first actuator ports 325 are in fluid communication with exhaust ports 323 and second actuator ports 322 are in fluid communication with supply ports 321. Referring now to FIG. 9-A, a section view taken along line 9-A in FIG. 8 illustrates recesses 345 and 347 in alignment with supply ports 321. Referring now to FIG. 9-B, a section view taken along line 9-B in FIG. 8 illustrates recesses 346 and 348 are aligned with first actuator ports 325. Referring now to FIG. 9-C, a section view taken along line 9-C in FIG. 8 illustrates recesses 345 and 347 in alignment with a pair of second actuator ports 322. Finally, referring to FIG. 9-D, a section view taken along line 9-D in FIG. 8 illustrates recesses 346 and 348 are aligned with a pair of exhaust ports 323.

Therefore, with rotary member 320 in the position shown in FIG. 8, first actuator ports 325 are in fluid communication with exhaust ports 323 (via recesses 346 and 348). In addition, second actuator ports 322 are in fluid communication with supply ports 321 (via recesses 345 and 347). In certain embodiments, a fluid supply system may be in fluid communication with supply ports 321, while exhaust ports 323 are vented to atmosphere. In addition, first actuator ports 325 may be in fluid communication with one side of an actuator assembly, while second actuator ports 322 are in fluid communication with an opposing side of the actuator assembly. In such embodiments, placing rotary member 320 in the position shown in FIG. 8 can move an actuator to one side of the actuator assembly (similar to the position of actuator assembly 130 shown in FIG. 1).

Figure 10:
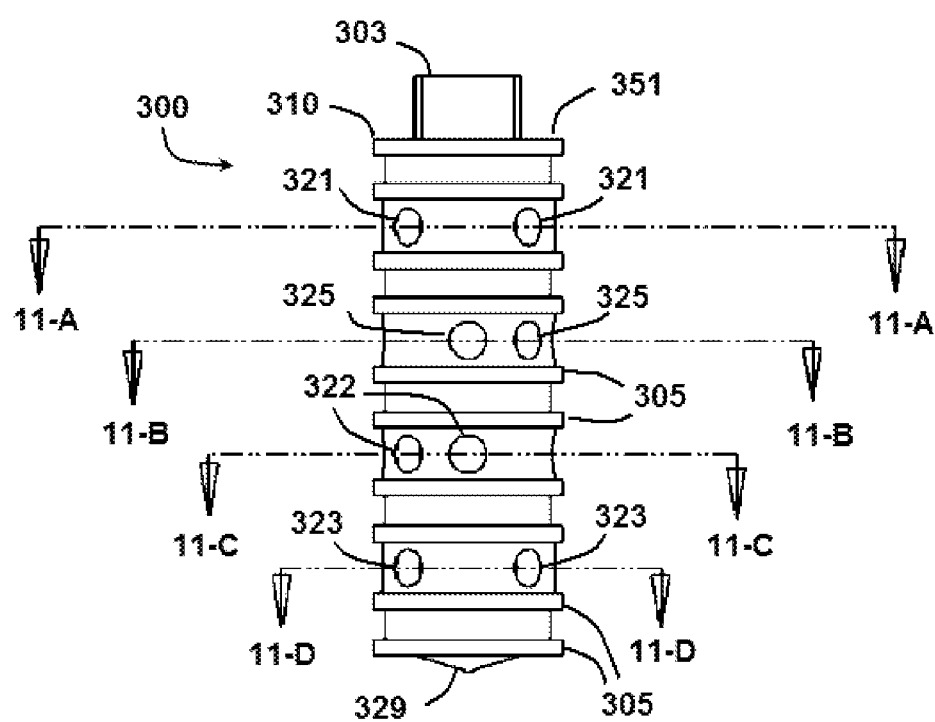
FIG. 10 illustrates an assembly view of the embodiment of FIG. 7 in a second position.

Referring now to FIG. 10, rotary member 320 has been rotated so that it is in a different position from that shown in FIG. 8. Specifically, rotary member 320 has been rotated so that first actuator ports 325 are in fluid communication with second actuator ports 322. In addition, supply ports 321 are not in fluid communication with either first actuator ports 325 or second actuator ports 322. Similarly, exhaust ports 323 are not in fluid communication with either first actuator ports 325 or second actuator ports 322.

Referring now to FIG. 11-A, a section view taken along line 11-A in FIG. 10 illustrates recesses 345 and 347 are not aligned with any of the supply ports 321. Referring now to FIG. 11-B, a section view taken along line 11-B in FIG. 10 illustrates recesses 345 and 347 are in alignment with a pair of first actuator ports 325. Also shown in FIG. 11-B, recesses 346 and 348 are aligned with another pair of first actuator ports 325.

Referring now to FIG. 11-C, a section view taken along line 11-C in FIG. 10 illustrates recesses 345 and 347 in alignment with a pair of second actuator ports 322. Also shown in FIG. 11-C, recesses 346 and 348 are aligned with another pair of second actuator ports 322. Finally, referring to FIG. 11-D, a section view taken along line 11-D in FIG. 10 illustrates recesses 346 and 348 are not aligned with any of the exhaust ports 323.

Therefore, with rotary member 320 in the position shown in FIG. 10, first actuator ports 325 are in fluid communication with second actuator ports (via recesses 345, 346, 347 and 348). In addition, supply ports 321 and exhaust ports 323 are not in fluid communication with any ports, and thus are effectively sealed. As previously explained, first actuator ports 325 may be in fluid communication with one side of an actuator assembly, while second actuator ports 322 are in fluid communication with an opposing side of the actuator assembly. In such embodiments, placing rotary member 320 in the position shown in FIG. 10 can move an actuator to an intermediate position in the actuator assembly (similar to the position of actuator assembly 130 shown in FIG. 2).

Figure 12:
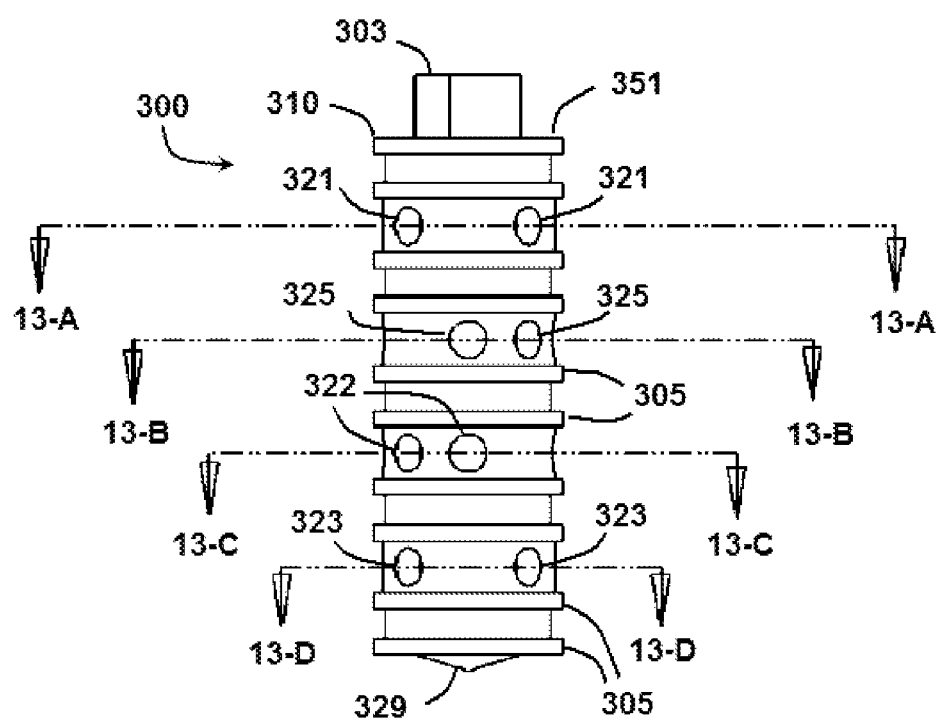
FIG. 12 illustrates an assembly view of the embodiment of FIG. 7 in a third position.

Referring now to FIG. 12, rotary member 320 has been rotated so that it is in a different position from that shown in FIG. 10. Specifically, rotary member 320 is positioned so that first actuator ports 325 are in fluid communication with supply ports 321 and second actuator ports 322 are in fluid communication with exhaust ports 323. Referring now to FIG. 13-A, a section view taken along line 13-A in FIG. 12 illustrates recesses 345 and 347 in alignment with a pair of supply ports 321. Referring now to FIG. 13-B, a section view taken along line 13-B in FIG. 12 illustrates recesses 345 and 347 are aligned with first actuator ports 325. Referring now to FIG. 13-C, a section view taken along line 13-C in FIG. 12 illustrates recesses 346 and 348 in alignment with a pair of second actuator ports 322. Finally, referring to FIG. 13-D, a section view taken along line 13-D in FIG. 12 illustrates recesses 346 and 348 are aligned with a pair of exhaust ports 323.

Therefore, with rotary member 320 in the position shown in FIG. 12, first actuator ports 325 are in fluid communication with supply ports 321 (via recesses 345 and 347). In addition, second actuator ports 322 are in fluid communication with exhaust ports 323 (via recesses 346 and 348). As previously explained, a fluid supply system may be in fluid communication with supply ports 321, while exhaust ports 323 are vented to atmosphere. In addition, first actuator ports 325 may be in fluid communication with one side of an actuator assembly, while second actuator ports 322 are in fluid communication with an opposing side of the actuator assembly. In such embodiments, placing rotary member 320 in the position shown in FIG. 12 can move an actuator the side of the actuator assembly that is opposite from actuator position when rotary member 320 is in the position shown in FIG. 8 (and similar to the position of actuator assembly 130 shown in FIG. 3).

Figure 14:
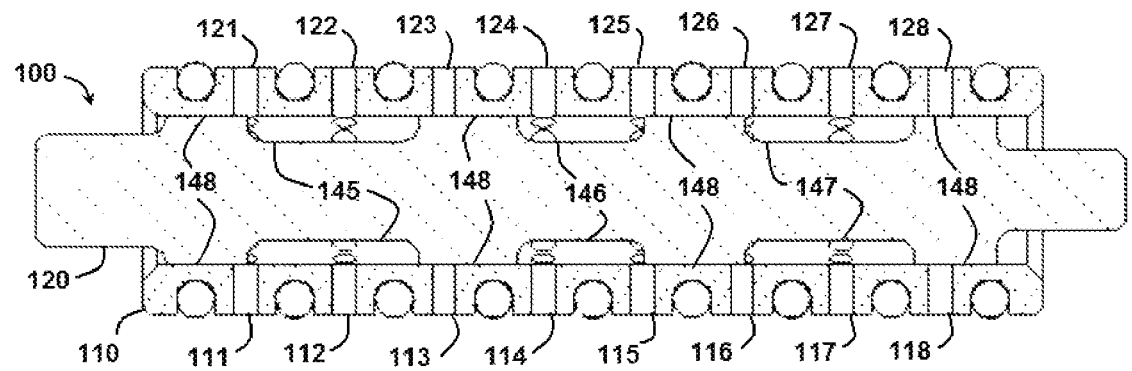
FIG. 14 illustrates a section view of the embodiment of FIG. 1 in a fourth position.

While it is understood that the figures contained in this disclosure are not to scale, the geometry of the various components can be selected to provide the desired flow dynamics and actuation timing. In the embodiments shown in FIGS. 1-3 and 4-6, outlet ports may be in fluid communication with both supply ports and exhaust ports in positions intermediate to those shown. For example, when spool 120 is in the position shown in FIG. 14, outlet ports 112/122, 114/124, 115/125, and 117/127 are in fluid communication with exhaust port 111/121 and supply port 116/126. If desired, the spool can be configured so that the outlet ports are blocked from the exhaust ports and the supply ports during the transition of spool 120. Referring now to FIG. 15-19, a solenoid valve 400 comprises a sliding member or spool 420 within a sleeve or housing 410. Solenoid valve 400 is generally equivalent to the embodiment shown in FIGS. 1-3, with the exception that the geometry of external surface 448 and recesses 445, 446 and 447 are different. Like elements are given like numbers as those shown in FIGS. 1-3, with the exception that the numbers begin with "4" instead of "1". Solenoid valve 400 can also be coupled to an actuator system (not shown for purposes of clarity) similar to that shown in FIGS. 1-3. Outlet ports 412/422 and 414/424 are therefore in fluid communication with one another, as are outlet ports 415/425 and 417/427.

Figure 15:
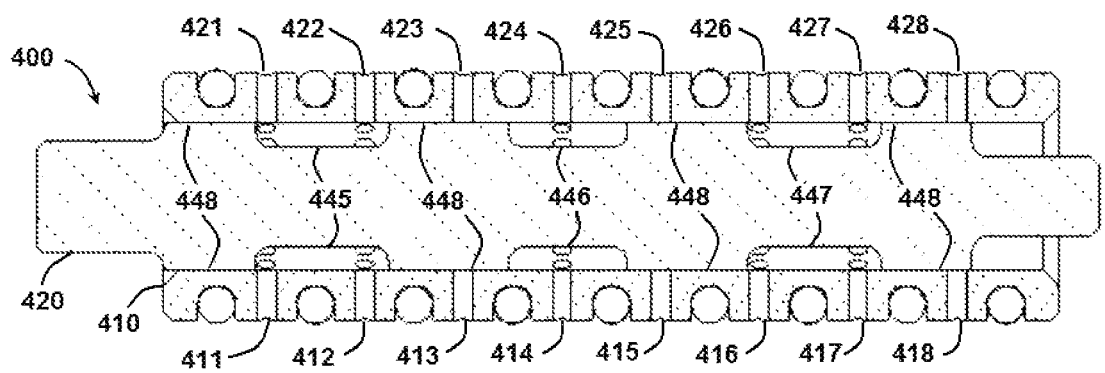
FIG. 15 illustrates a section view of an exemplary embodiment of a solenoid valve assembly in a first position.
Figure 16:
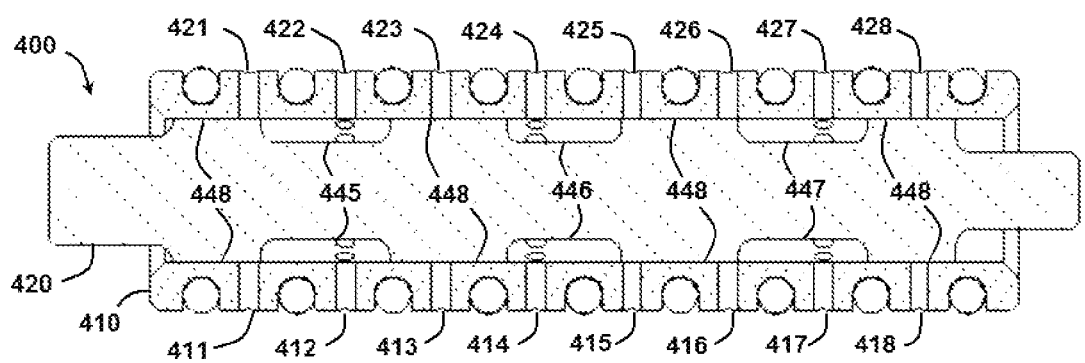
FIG. 16 illustrates a section view of an exemplary embodiment of a solenoid valve assembly in a second position.
Figure 17:
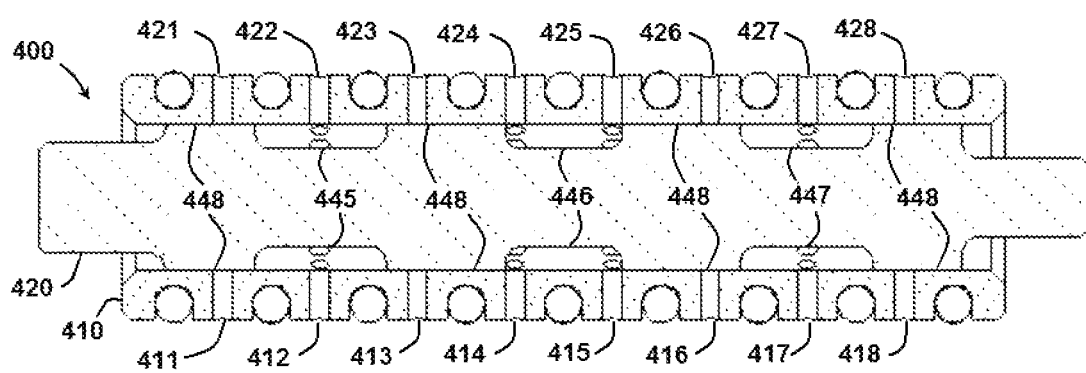
FIG. 17 illustrates a section view of an exemplary embodiment of a solenoid valve assembly in a third position.
Figure 18:
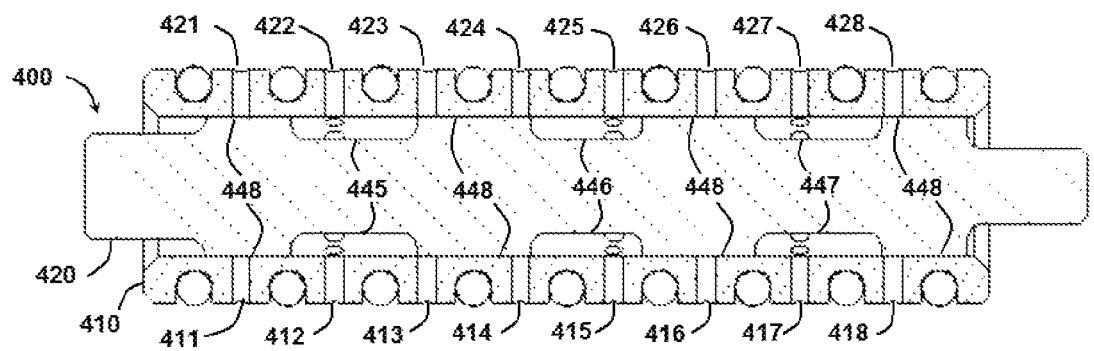
FIG. 18 illustrates a section view of an exemplary embodiment of a solenoid valve assembly in a fourth position.
Figure 19:
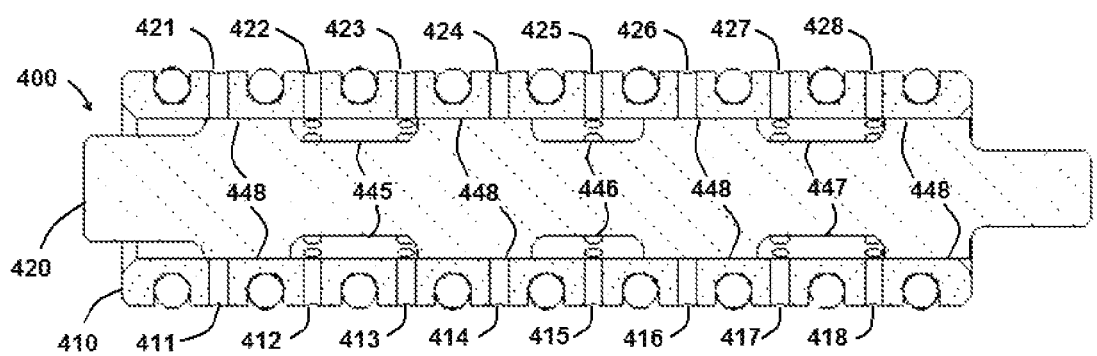
FIG. 19 illustrates a section view of an exemplary embodiment of a solenoid valve assembly in a fifth position.

As shown in FIG. 15, spool 420 is in the leftmost position, and outlet ports 412/422 and 414/424 are in fluid communication with exhaust port 411/421. In addition, outlet ports 415/425 and 417/427 are in fluid communication with supply port 416/426. In the position shown in FIG. 16, spool 420 has shifted slightly to the right, and all ports are isolated from each other. As spool 420 shifts further to the right, it reaches the central position shown in FIG. 17, and outlet ports 412/422, 414/424, 415/425, and 417/427 are in fluid communication with each other (but isolated from exhaust ports 411/421, 418/428 and supply ports 413/423, 416/426). As spool 420 shifts further to the right as shown in FIG. 18, all ports are again isolated from each other. Finally, spool 420 reaches the rightmost position shown in FIG. 19, and outlet ports 412/422 and 414/424 are in fluid communication with supply port 413/423. In addition, outlet ports 415/425 and 417/427 are in fluid communication with exhaust port 418/428. In summary, the embodiment shown in FIGS. 15-19 is generally equivalent to that shown in FIGS. 1-3, but the geometry of spool 420 and external surface 448 (including the length and spacing of recesses 445, 446 and 447) is modified. The modifications require spool 420 to travel a greater distance between the leftmost and rightmost positions and provide isolation of all ports in certain positions of spool 420.

Referring now to FIGS. 20-24, a modified version of the embodiment shown in FIGS. 4-6 also comprises a spool with greater travel that is capable of isolating all ports when in intermediate positions. Like elements are given like numbers as those shown in FIGS. 4-6, with the exception that the numbers begin with "5" instead of "2". Solenoid valve 500 is generally equivalent to the embodiment shown in FIGS. 4-6, with the exception that the geometry of external surface 548 and recesses 545, 546 and 547 are different.

Figure 20:
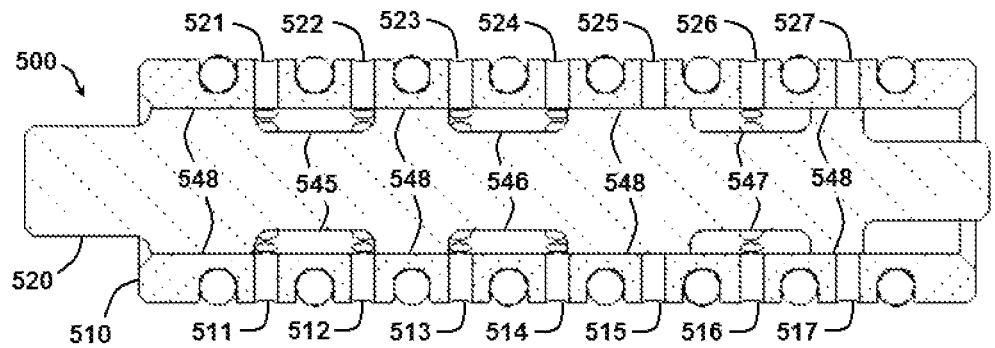
FIG. 20 illustrates a section view of an exemplary embodiment of a solenoid valve assembly in a first position.
Figure 21:
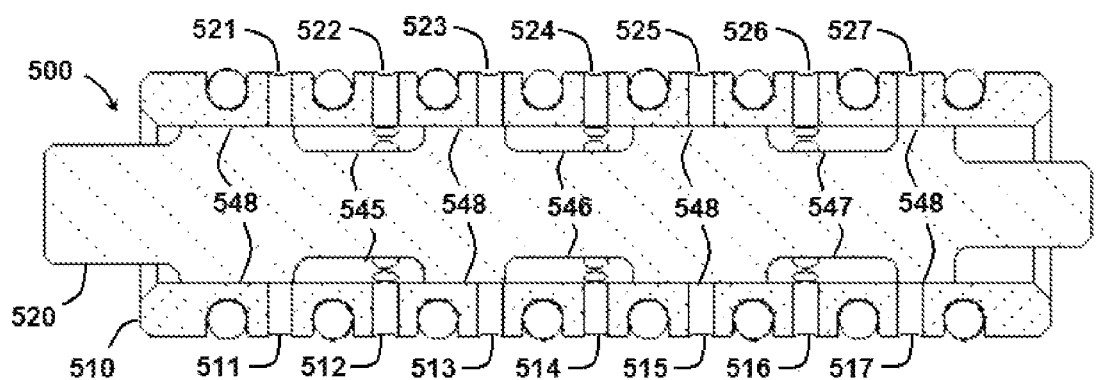
FIG. 21 illustrates a section view of an exemplary embodiment of a solenoid valve assembly in a second position.
Figure 22:
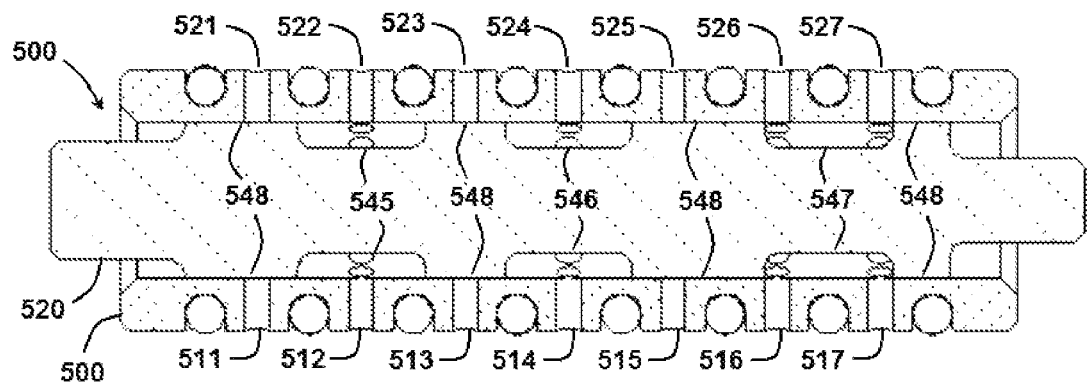
FIG. 22 illustrates a section view of an exemplary embodiment of a solenoid valve assembly in a third position.
Figure 23:
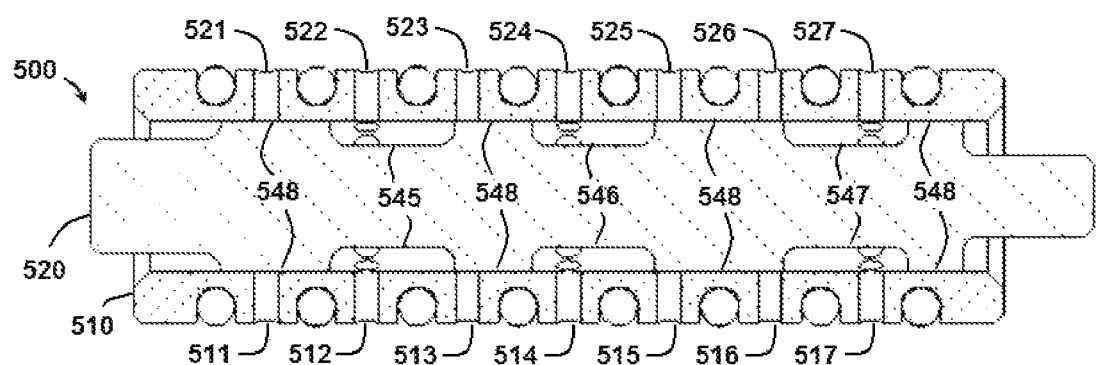
FIG. 23 illustrates a section view of an exemplary embodiment of a solenoid valve assembly in a fourth position.
Figure 24:
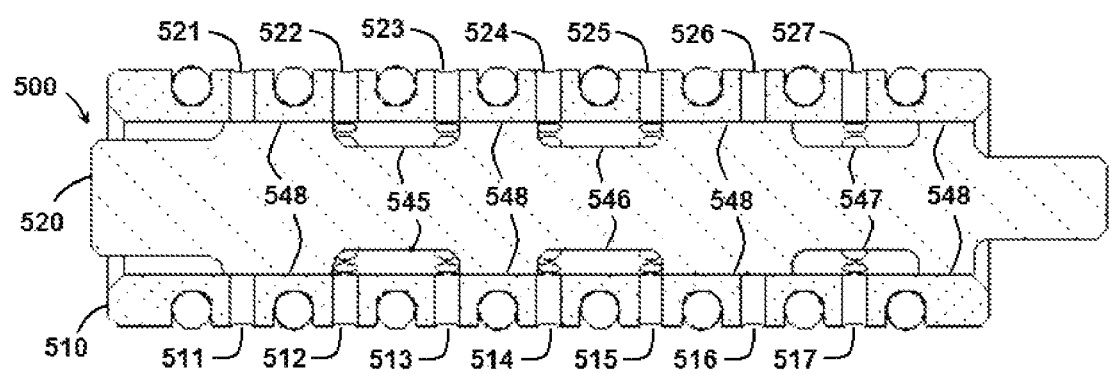
FIG. 24 illustrates a section view of an exemplary embodiment of a solenoid valve assembly in a fifth position.

As shown in the leftmost position of FIG. 20, outlet ports 512/522 and 516/526 are in fluid communication with exhaust port 511/521. In addition, outlet ports 514/524 and 517/527 are in fluid communication with supply port 513/523. As spool 520 moves to the right in the position shown in FIG. 21, all ports are isolated. When spool 520 moves to the central position shown in FIG. 22, outlet ports 512/522, 514/524, 516/526, and 517/527 are in fluid communication (and isolated from exhaust ports 511/521, 515/525 and supply ports 513/523. As spool 520 moves to the right in the position shown in FIG. 23, all ports are isolated. When spool 520 moves to the rightmost position shown in FIG. 24, outlet ports 512/522 and 516/526 are in fluid communication with supply port 513/523. In addition, outlet ports 514/524 and 517/527 are in fluid communication with exhaust port 515/525.

In this disclosure, terms such as "right" and "left" are used for convenience and clarity with respect to the associated figures. It is understood by those skilled in the art, that such descriptions are not limiting, and that other exemplary embodiments may comprise other configurations (for example, vertical).

While exemplary embodiments are described herein, it will be understood that various modifications to the system and apparatus can be made without departing from the scope of the present invention. For example, the number of ports may be different in other embodiments.

The invention claimed is:

1. A system comprising:
   a housing comprising:
      a first end;
      a second end;
      a plurality of ports comprising supply ports, exhaust ports, and outlet ports; and
   a spool received within the housing, the spool configured to move within the housing from a first position to a second position and to a third position, wherein:
      the second position is between the first position and the third position; and
      a first outlet port is in exclusive fluid communication with a second outlet port when the spool is in the second position.

2. The system of claim 1 wherein the first outlet port is adjacent the second outlet port.

3. The system of claim 1 wherein the spool is configured to slide laterally within the housing.

4. The system of claim 1 wherein the spool is configured to rotate within the housing.

5. The system of claim 1, further comprising an actuator, wherein:
   the actuator comprises a first side and a second side;
   the first outlet port is in communication with the first side of the actuator; and
   the second outlet port is in communication with the second side of the actuator.

6. The system of claim 5 further comprising a first biasing member configured to exert a first force upon the actuator and a second biasing member configured to exert a second force upon the actuator.

7. The system of claim 1 wherein:
   when the spool is in the first position:
      a supply port is in fluid communication with the first outlet port, and an exhaust port is in fluid communication with the second outlet port; and
   when the spool is in the third position:
      a supply port is in fluid communication with the second outlet port, and an exhaust port is in fluid communication with the first outlet port.

8. The system of claim 1 wherein:
   the spool is proximal to the first end of the housing when the spool is in the first position;
   the spool is proximal to the second end of the housing when the spool is in the third position.

9. The system of claim 1 wherein:
   the plurality of ports extend through the housing; and
   the spool comprises a plurality of recesses configured to align with the plurality of ports.

10. The system of claim 9 wherein the recesses extend circumferentially around the spool.

11. The system of claim 10 wherein the spool is configured to slide laterally within the housing to allow a first set of ports to be in fluid communication with each other when the spool is in the first position, a second set of ports to be in fluid communication with each other when the spool is in the second position, and a third set of ports to be in fluid communication with each other when the spool is in the third position.

12. The system of claim 9 wherein the recesses extend longitudinally along the spool.

13. The system of claim 12 wherein the spool is configured to rotate within the housing to allow a first set of ports to be in fluid communication with each other when the spool is in the first position, a second set of ports to be in fluid communication with each other when the spool is in the second position, and a third set of ports to be in fluid communication with each other when the spool is in the third position.

14. A system comprising:
   an actuator assembly comprising:
      a casing comprising a volume of fluid;

an actuator disposed within the casing, wherein the actuator separates the volume of fluid into a first volume and a second volume; and a solenoid valve assembly in fluid communication with the actuator assembly, wherein:

the solenoid assembly can be placed in a first position, a second position, or a third position;

the first volume is not in fluid communication with the second volume when the solenoid assembly is in the first position or the third position; and the first volume is in exclusive fluid communication with the second volume when the solenoid assembly is in the second position.

15. The system of claim 14, further comprising a fluid supply system wherein:

the fluid supply system is in fluid communication with the first volume when the solenoid valve assembly is in the first position; and the fluid supply system is in fluid communication with the second volume when the solenoid valve assembly is in the third position.

16. The system of claim 14 wherein the solenoid valve assembly comprises a spool configured to slide laterally within the housing.

17. The system of claim 14 wherein the solenoid valve assembly comprises a spool configured to rotate within the housing.

18. A system comprising:

an actuator assembly comprising an actuator having a first volume of fluid on a first side of the actuator and a second volume of fluid on a second side of the actuator; and a solenoid valve with a slide member and with a sleeve comprising a plurality of ports, wherein:

the solenoid valve is in fluid communication with the actuator assembly:

a first port is in fluid communication with the actuator;

a second port is in fluid communication with the actuator; and the slide member configured to move within the sleeve from a first position to a second position and to a third position, wherein:

the second position is between the first position and the third position; and the first port is in exclusive fluid communication with the second port when the slide member is in the second position.

19. The system of claim 18 further comprising:

a fluid supply;

a third port in fluid communication with the fluid supply;

a fourth port configured to vent to the environment; wherein the third port is in exclusive fluid communication with the first port, and the fourth port is in exclusive fluid communication with the second port when the slide member is in the first position;

the third and fourth ports are maintained in isolation, and the first and second ports are in exclusive fluid communication when the slide member is in the second position, and the third port is in exclusive fluid communication with the second port, and the fourth port is in exclusive fluid communication with the first port when the slide member is in the third position.

20. The system of claim 18, wherein:

the actuator comprises a piston;

the actuator comprises a first biasing member configured to engage a first side of the piston; and the actuator comprises a second biasing member configured to engage a second side of the piston.

21. The system of claim 18, wherein:

the solenoid valve comprises a slide member disposed within the sleeve;

the slide member is configured to slide from a first position proximal to a first end of the sleeve to a second position proximal to a second end of the sleeve; and the first port and the second port are in fluid communication with each other when the slide valve is in a third position between the first position and the second position.

22. A system comprising:

a housing comprising:

an outer surface;

an inner surface forming an internal bore;

a first end;

a second end;

a supply port;

an exhaust port;

a first outlet port; and a second outlet port, wherein the supply port, the exhaust port, the first outlet port and the second outlet port each extend from the outer surface of the housing to the inner surface of the housing;

a sliding member received within the internal bore, wherein the sliding member comprises:

a plurality of sealing members configured to prevent fluid communication between a pair of adjacent ports; and a plurality of recesses configured to allow fluid communication between a pair of adjacent ports, wherein a first recess allows exclusive communication between the first outlet port and the second outlet port when the sliding member is positioned at an intermediate position between the first end and the second end.

23. A system comprising:

a three-position solenoid valve comprising a first valve position, a second valve position, and a third valve position;

a double-acting pneumatic actuator coupled to the three-position solenoid valve; and a fluid supply coupled to the double-acting pneumatic actuator, wherein:

the double-acting pneumatic actuator comprises a first cylinder chamber and a second cylinder chamber;

the first valve position couples the first cylinder chamber to the fluid supply and couples the second cylinder chamber to atmosphere;

the second valve position exclusively couples the first and second cylinder chambers together; and the third valve position couples the second cylinder chamber to the fluid supply and couples the first cylinder chamber to atmosphere.

\* \* \* \* \*

UNITED STATES PATENT AND TRADEMARK OFFICE
CERTIFICATE OF CORRECTION

Page 1 of 1

PATENT NO. : 8,635,940 B2
APPLICATION NO. : 12/811802
DATED : January 28, 2014
INVENTOR(S) : Michael Goldfarb and Xiangrong Shen It is certified that error appears in the above-identified patent and that said Letters Patent is hereby corrected as shown below:

In the Specification
In column 1, lines 6-8, delete
"The government may own rights in this invention pursuant to grant numbers N660001-06-8005 JHUAPL from the Department of Defense."
and insert
--This invention was made with Government support under N660001-06-8005 awarded by the Department of Defense. The Government has certain rights in this invention.-- therefor.

Signed and Sealed this
Fifteenth Day of April, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,635,940 B2 | Page 1 of 1 |
| APPLICATION NO. | : 12/811802 | |
| DATED | : January 28, 2014 | |
| INVENTOR(S) | : Goldfarb et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 858 days.

Signed and Sealed this
Nineteenth Day of May, 2015

Michelle K. Lee
*Director of the United States Patent and Trademark Office*